United States Patent
Pike

(10) Patent No.: US 9,033,642 B2
(45) Date of Patent: May 19, 2015

(54) LAZY LAURA

(71) Applicant: Daniel C Pike, Madison, OH (US)

(72) Inventor: Daniel C Pike, Madison, OH (US)

(*) Notice: Subject to any disclaimer, the term of this patent is extended or adjusted under 35 U.S.C. 154(b) by 0 days.

(21) Appl. No.: 14/042,989

(22) Filed: Oct. 1, 2013

(65) Prior Publication Data

US 2014/0308103 A1 Oct. 16, 2014

Related U.S. Application Data

(60) Provisional application No. 61/810,784, filed on Apr. 11, 2013.

(51) Int. Cl.
*B60P 1/64* (2006.01)
*B60P 1/52* (2006.01)

(52) U.S. Cl.
CPC ... *B60P 1/64* (2013.01); *B60P 1/52* (2013.01); *B60P 1/6427* (2013.01)

(58) Field of Classification Search
CPC ............. B60P 1/52; B60P 1/64; B60P 1/6427
USPC ........................................................ 414/522
See application file for complete search history.

(56) References Cited

U.S. PATENT DOCUMENTS

| | | | | |
|---|---|---|---|---|
| 2,904,196 A * | 9/1959 | Teixeira | ......................... | 414/534 |
| 3,220,466 A * | 11/1965 | Kummerman | ................ | 160/188 |
| 5,054,987 A * | 10/1991 | Thornton | ...................... | 414/390 |
| 5,090,335 A * | 2/1992 | Russell | ........................... | 108/44 |
| 5,513,941 A * | 5/1996 | Kulas et al. | ................... | 414/522 |
| 7,416,234 B2 * | 8/2008 | Bequette | .................... | 296/26.09 |
| 8,006,935 B2 * | 8/2011 | Wells et al. | ................. | 244/137.1 |
| 8,061,953 B2 * | 11/2011 | Stoeckl et al. | ................ | 414/522 |
| 2002/0076312 A1* | 6/2002 | Schatzler et al. | ............. | 414/462 |
| 2006/0033377 A1* | 2/2006 | Frimel | ......................... | 298/1 A |
| 2008/0213058 A1* | 9/2008 | Simmons et al. | ............... | 410/46 |
| 2008/0271646 A1* | 11/2008 | Fenati | ......................... | 108/51.11 |
| 2013/0170934 A1* | 7/2013 | Parsons et al. | ................ | 414/535 |
| 2013/0266412 A1* | 10/2013 | Young | ............................. | 414/537 |
| 2013/0334783 A1* | 12/2013 | Carruyo | ...................... | 280/79.11 |

* cited by examiner

*Primary Examiner* — Saul Rodriguez
*Assistant Examiner* — Ashley Romano

(57) ABSTRACT

Lazy Laura is a cargo handling device designed to move cargo front to rear or vice versa consisting of multiple free-floating panel's (1) that can be added or removed to achieve any desired length. Each panel being joined by one or more 360-degree hinge (2), which may have a removable pin (3). Each said panel is equipped with plurality of rollers (5) fixedly attached enabling said panels to move forward or to the rear of a defined cargo area. Panels fully loaded may be pushed or pulled through use of grips (4). No framework or mechanical alterations need be made to the cargo area.

4 Claims, 4 Drawing Sheets

FIGURE 3
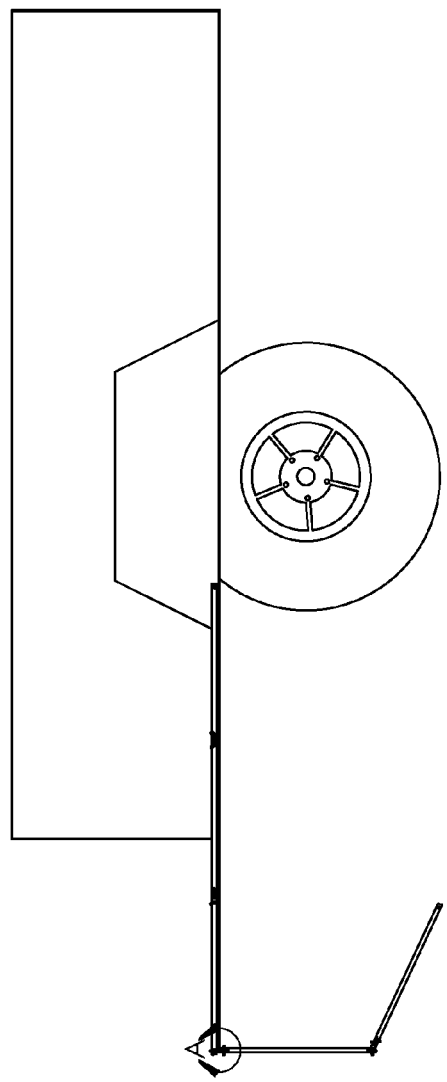
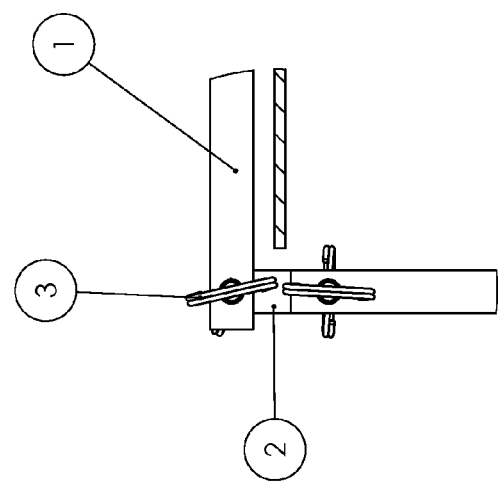
DETAIL A
SCALE 1 : 2

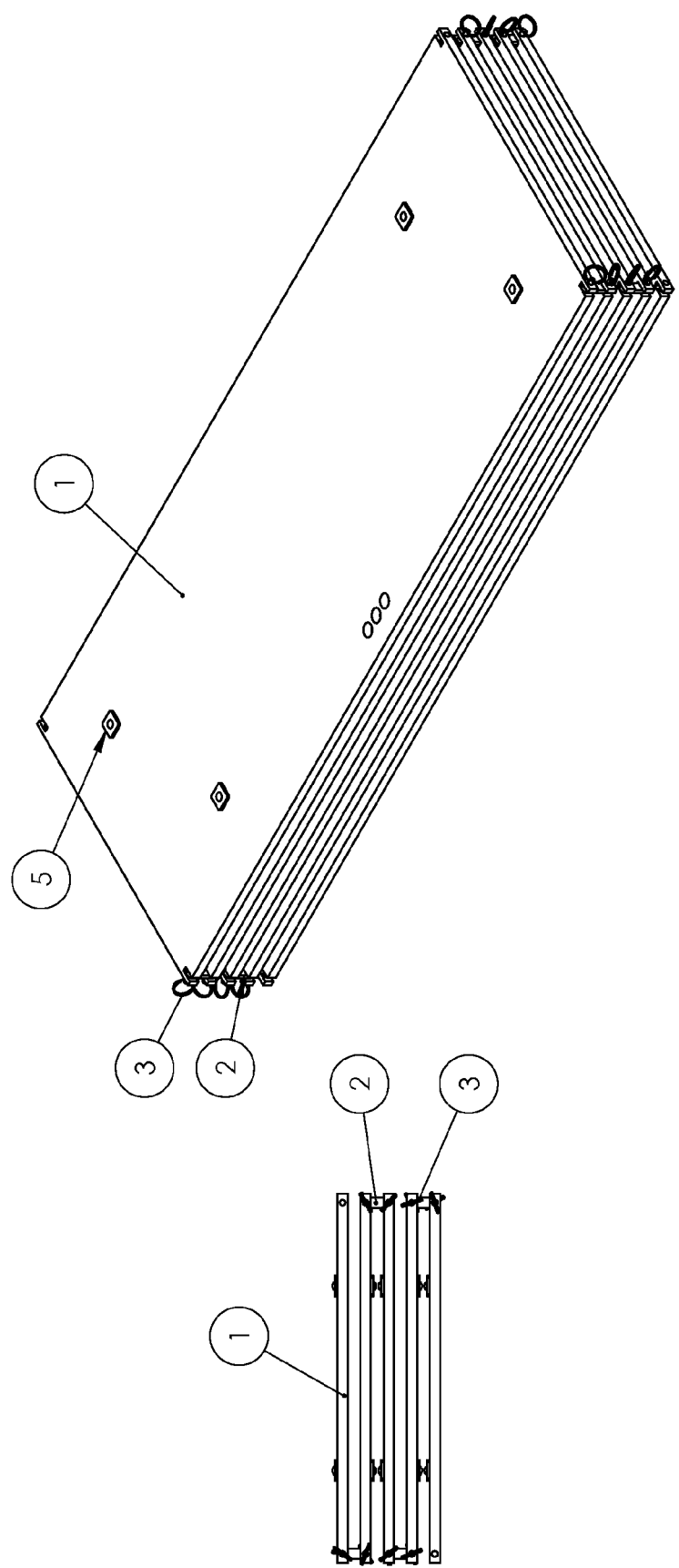

LAZY LAURA

BACKGROUND OF THE INVENTION

The concept of this invention is a free floating cargo movement system, which enables a user at a loading/unloading end of a cargo storage area, to load and/or unload all objects from or to a remote interior location in the storage area. Such places as, a cargo van, deep in an attic, or a truck adjacent to the passenger cabs.

Consisting of multiple panels that can be added or removed to achieve any desired length. Each said panel is joined with 360-degree hinges, which may have removable pins. Each said panel is equipped with plurality of rollers fixedly attached enabling said panels to move forward or to the rear of cargo area. No framework or mechanical alterations need be made to the cargo area; hence no skill in the trade is needed to install.

Said panels are designed to bring cargo to where it can be ergonomically loaded or unloaded without climbing into cargo area. When facing the open end of the cargo area, first panel can be unloaded and removed through the use of said removable pin. Remaining said panels might then be pulled toward user for removal of cargo. After removing cargo from second panel, it can then be removed and process repeated until all cargo is removed. The process is reversible when desiring to move cargo into remote area. Simply put cargo on said panel, place second panel into position, realign hinges and place said pin into slot thereby elongating platform. Repeat as needed.

FIELD OF THE INVENTION

This invention relates to a method and an apparatus for unloading objects from, a stationary or mobile storage area, such as a pickup truck. In particular, this invention pertains to multiple sliding panels with are attached with 360-degree hinges. These hinges are designed to stack over or fold under and contain a removable pin, which allows the panels to also be removed. Once the panel has been removed the next panel may be manually pulled into place and relieved of cargo. Objects stored at a remote interior end of the storage area may now be brought to the user at the loading end.

DESCRIPTION OF FIGURES

FIG. 3 details how said 360-degree hinges (2) allow said panel's (1) to drop and fold out of the way of end user.

FIG. 4 depicts the apparatus folded upon itself and the staggered placement of said rollers (5).

DESCRIPTION OF RELATED ART

Figure 1:
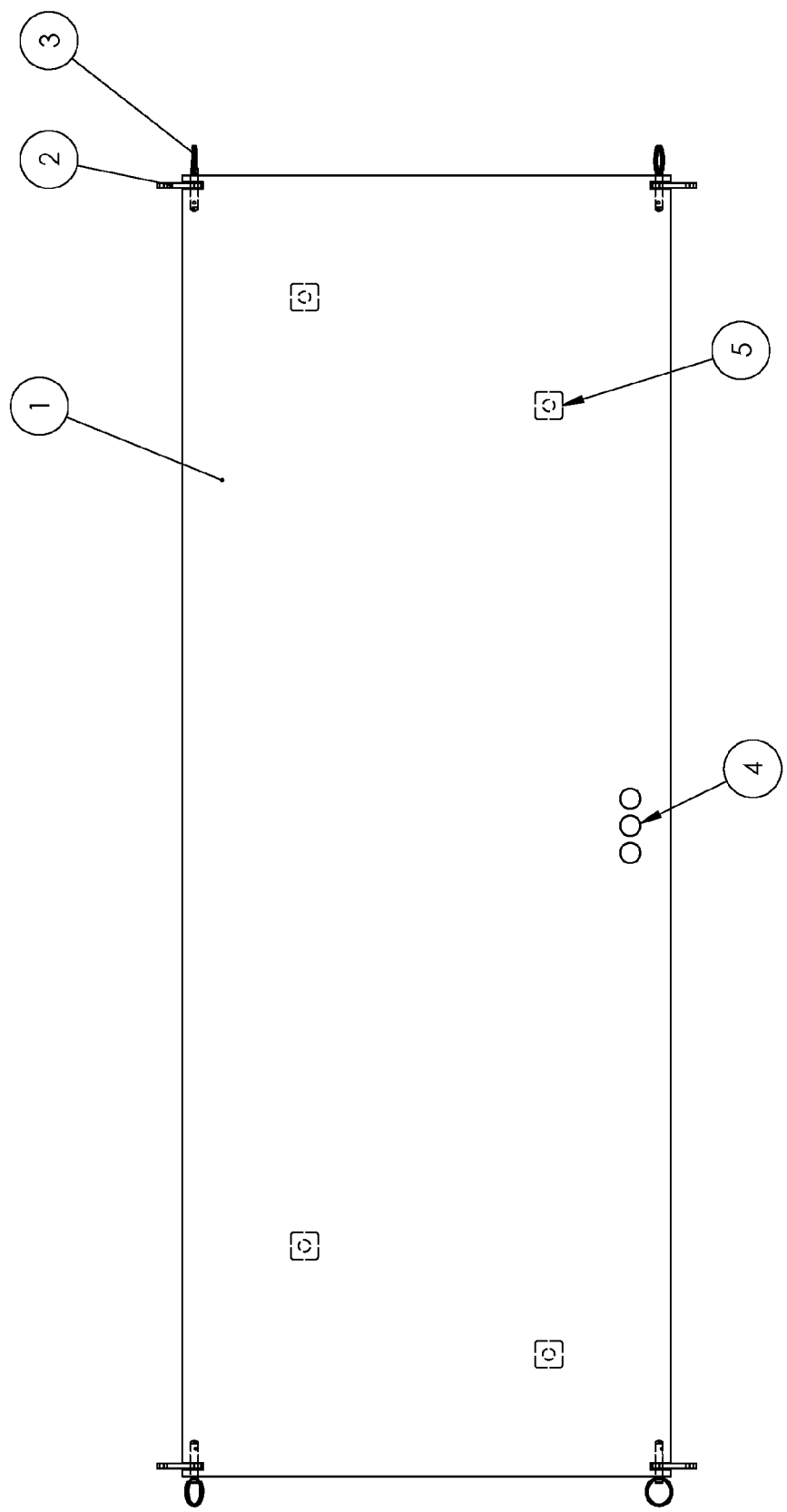
FIG. 1 shows one panel (1) of desired dimension, 360-degree hinge (2) at each of 4 corners, release pins (3) which hold said hinges in place, finger holes (4) and weight carrying roller (5).
Figure 2:
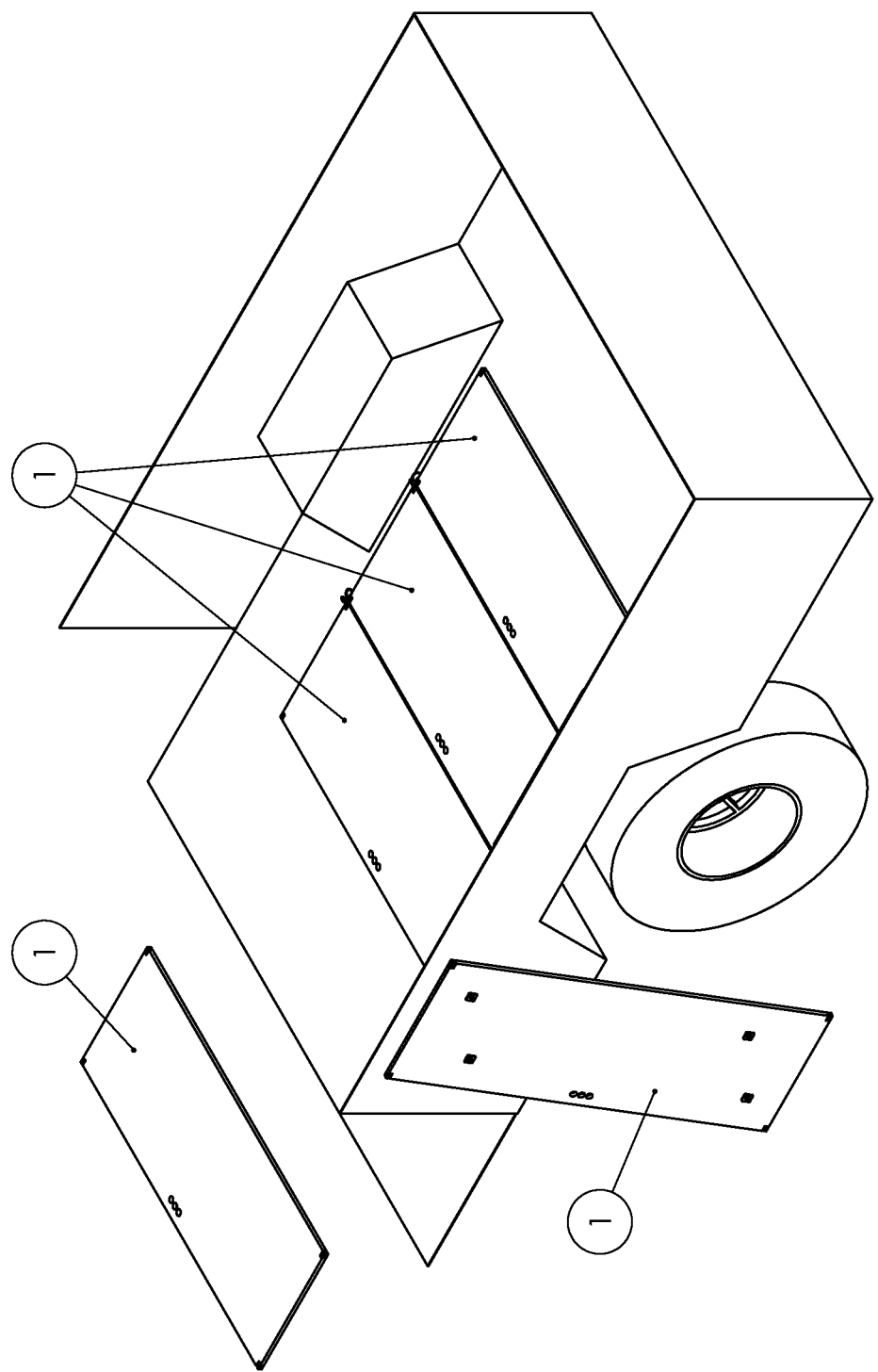
FIG. 2 shows a series of panels (1) in cargo area, the last having been removed by pulling said release pins of said 360-degree hinge and set aside and another said panel (1) freed from other said panels (1) in cargo area.

By way of the example, the prior art includes U.S. Pat. No. 6,065,792 A to Sciullo, Burns and others, discloses one solid plate the length and width of a pick-up truck bed which has structural attachments to the frame and or bed of the truck. The plate then slides over the tailgate and locks in position with support legs. The plate serves to extend the bed of the truck giving a longer workspace.

U.S. Pat. No. 4,629,390 A to Burke and others describes a flexible conveyor sheet wound on a drum and can be unwound onto the vehicle bed to receive materials loaded therein. A motor driven or manually operated drive system rotates the drum to unload the cargo as the conveyor sheet is wound up on the drum.

U.S. Pat. No. 7,320,572 Smith and others also describes a flexible sheet on a drum. With the length of the sheet being sufficient to be fully loaded and have length to be tucked under rear wheels and truck being driven in reverse that the cargo would fall out.

U.S. Pat. No. 8,033,776 to Calhoun and others describe a system for moving cargo by permanently attaching rails to cargo area. These also include various means of mechanical movement.

There is an ongoing need for improvements in loading and unloading of cargo. For example, a small businessman or woman, a gentleman farmer or a reseller often makes use of pickup trucks to carry goods. These business entities need labor, time and energy saving tools. A world on the move oftentimes needs flexibility and solutions in loading as well as unloading as the need arises.

Therefore, it is desirable to provide an useful tool which is unattached to a vehicle or other storage area but will enhance the process of loading to or unloading objects from the interior end of a cargo bed (or storage container), which is remote to the exterior loading area. Because such an apparatus would generally be employed in the cargo bed of a vehicle, the apparatus may in some instance interfere with the ability to carry certain types of loads for which the apparatus is not required. As such, it is desirable that the loading, unloading apparatus be easily removable from the vehicle by the user.

An object of this invention is the provision of apparatus useful in unloading objects from a storage container, stationary or mobile, and in retaining objects on the cargo bed of a mobile transporter, that overcomes the disadvantages of the prior art.

Another object of this invention is the provision of a simple manual apparatus, which enables the easy unloading of stored objects from the back of a pickup truck or like mobile transporter.

Yet another object of this invention is the provision of a manual apparatus, which is low in cost, versatile, and easily installed and/or removed without tools or mechanical alterations to the storage area.

Yet another object of this invention is the provision of an apparatus that can be hand operated by individuals in the field, which requires little or no technical expertise.

Yet another object of this invention is the flexibility of desired measurements. Panels maybe made to any desired width and panels added to fill desired length of cargo storage area.

Furthermore it is the object of this invention to provide the end user with the means to load and unload cargo while maintaining his or her feet firmly on the ground providing an ergonomically correct position for lifting of heavy materials.

I claim:

1. A cargo movement device comprising:
   a plurality of unconstrained panels;
   a plurality of independently placed bearing members mounted to an underside of said panels;
   said plurality of unconstrained panels connected at adjacent corners by hinges;
   wherein said plurality of unconstrained panels are horizontally positioned in a cargo area;

wherein said cargo area is a bed of a vehicle;

wherein said panels have a generally rectangular shape having a width approximating the width of the cargo area;

wherein the plurality of independently placed bearing members facilitate relative movement of the panels within the cargo area;

wherein said hinges allow for 360 degrees of movement of one panel with respect to an adjacently connected panel, allowing panels to fold or stack;

wherein said hinges are held in place by manually manipulated, quick release removable pins, allowing the panels to separate;

wherein said panels are comprised of a rigid material;

wherein said panels comprise finger holes to allow for manipulation by a user;

wherein said independently placed bearing members allow the panels to move from an interior position within the cargo area to an accessible end position of the cargo area, the bearing members remaining in direct cooperation with the cargo area;

wherein said independently placed bearing members are strategically placed to enable the plurality of panels to fold together without interference from the bearing members;

wherein the cargo movement device is free floating within the cargo area, requiring no modification to the vehicle.

2. The cargo movement device of claim 1, wherein said bearing members are rollers.

3. The cargo movement device of claim 1, wherein said bearing members are slides.

4. The cargo movement device of claim 1, wherein the cargo movement device is scalable to receive additional panels or remove existing panels.

* * * * *